US012690563B1

(12) United States Patent
Wang et al.

(10) Patent No.: US 12,690,563 B1
(45) Date of Patent: Jul. 28, 2026

(54) MANUAL PET FEEDER

(71) Applicant: Shenzhen Qianhai Runway Technology Co., LTD., Guangdong (CN)

(72) Inventors: Jing Wang, Shenzhen (CN); Junsheng Chen, Shenzhen (CN); Zhimin Li, Shenzhen (CN)

(73) Assignee: Shenzhen Qianhai Runway Technology Co., LTD., Shenzhen (CN)

( * ) Notice: Subject to any disclaimer, the term of this patent is extended or adjusted under 35 U.S.C. 154(b) by 0 days.

(21) Appl. No.: 19/442,891

(22) Filed: Jan. 7, 2026

(30) Foreign Application Priority Data

Aug. 25, 2025 (CN) .......................... 202521811662.7

(51) Int. Cl.
*A01K 5/01* (2006.01)
(52) U.S. Cl.
CPC .................................. *A01K 5/0114* (2013.01)
(58) Field of Classification Search
CPC ...... A01K 5/0114; A01K 5/02; A01K 5/0208; A01K 5/0225; A01K 5/0258; A01K 5/0275; A01K 39/01; A01K 39/012; A01K 39/0125
See application file for complete search history.

(56) References Cited

U.S. PATENT DOCUMENTS

| 11,844,334 | B1 * | 12/2023 | McDaniel | .............. F16M 11/26 |
| 2005/0076843 | A1 * | 4/2005 | Ansaldo | ............... A01K 5/0225 |
| | | | | 119/57.91 |
| 2005/0241588 | A1 * | 11/2005 | Foster | .................... A01K 61/80 |
| | | | | 119/57.91 |
| 2022/0378014 | A1 * | 12/2022 | Wilson | ................... B65D 83/18 |
| 2023/0180714 | A1 * | 6/2023 | Wu | ....................... A01K 5/0142 |
| | | | | 119/57 |
| 2024/0268341 | A1 * | 8/2024 | Sides | ................... A01K 5/0225 |
| 2024/0306601 | A1 * | 9/2024 | Wu | ....................... A01K 5/0291 |
| 2024/0415093 | A1 * | 12/2024 | Pell | ....................... A01K 5/0225 |

* cited by examiner

*Primary Examiner* — Trinh T Nguyen
(74) *Attorney, Agent, or Firm* — Birchwood IP

(57) ABSTRACT

The present invention discloses a manual pet feeder. The manual pet feeder includes a barrel body having an opening at a top portion thereof and a feed dispensing mechanism being disposed at a bottom portion of the barrel body corresponding to the feed outlet; an upper cover, mounted on the opening at the top portion of the barrel body, where a top portion of the upper cover is provided with a manual driving mechanism; a drive mechanism is disposed inside a side face of the barrel body, and the manual driving mechanism is connected to the feed dispensing mechanism via the drive mechanism. In the manual pet feeder, a handle is disposed at the top portion of the barrel body, and the feed dispensing mechanism is driven to rotate by the handle, thereby raising the position of action for operating the feed dispensing mechanism to the upper cover.

9 Claims, 5 Drawing Sheets

MANUAL PET FEEDER

CROSS REFERENCE TO RELATED APPLICATION

The present application claims priority to Chinese Patent Application No. 202521811662.7, filed on Aug. 25, 2025. The entire disclosure of the above-mentioned patent application is incorporated herein by reference and constitutes part of the description.

TECHNICAL FIELD

The present disclosure relates to the field of pet supplies, and particularly to a manual pet feeder.

BACKGROUND OF THE INVENTION

In the prior art, an electric impeller is generally adopted in pet feeders to dispense pet food. Due to the limitations of the impeller dispensing form, large-sized pet food cannot be accommodated. Meanwhile, the whole body of the feeder cannot be fully washed with water. The circuit board will be damaged and rendered unusable upon contact with water. Furthermore, buttons or trigger-type operations cannot prevent pets from operating the device by themselves.

For manual feeders, dispensing pet food requires operation of relevant mechanisms. In traditional feeders, the feed dispensing mechanism is located at the lower part, requiring the user to lift the feeder or squat down to operate it. Such feeders are inconvenient to operate and are not suitable for designing large-capacity food bins. Additionally, due to factors such as gravity, chute slope, valves, and volume, the dispensing flow rate is difficult to control in general feeders.

BRIEF SUMMARY OF THE INVENTION

To overcome the problems of inconvenient dispensing operation, inconvenience in designing large-capacity food bins, and difficulties in controlling the dispensing flow rate in the existing manual feeders, the present disclosure provides a manual pet feeder that combines easy operation with a large food bin design, can be fully washable, allows precise control of dispensing amount, and prevents pets from operating the device by themselves.

The technical solutions of the present disclosure are as follows:

A manual pet feeder is provided, including:

a barrel body, having an opening at a top portion thereof and a feed outlet at a bottom portion thereof, and a feed dispensing mechanism being disposed at the bottom portion of the barrel body corresponding to the feed outlet; and an upper cover, detachably and sealingly mounted on the opening at the top portion of the barrel body, and a top portion of the upper cover having a rotatable manual driving mechanism;

a drive mechanism being disposed inside a side face of the barrel body, and the manual driving mechanism being connected to the feed dispensing mechanism via the drive mechanism to drive the feed dispensing mechanism to operate, so that pet food stored in the barrel body is output through the feed outlet.

As a preferred embodiment of the present disclosure, the manual pet feeder further includes a food bowl, a barrel body seat is disposed at a rear portion of the food bowl, the barrel body is detachably connected to the barrel body seat, a concave tray is detachably mounted at a front portion of the food bowl, and the feed outlet is located above an edge of the tray.

As a preferred embodiment of the present disclosure, a funnel-shaped converging port and a transversely-arranged feed dispensing pipe are disposed at a lower end inside the barrel body, the feed dispensing pipe is internally provided with the feed dispensing mechanism, one end of the feed dispensing pipe is abutted to the converging port, and the other end of the feed dispensing pipe is abutted to the feed outlet.

As a preferred embodiment of the present disclosure, the drive mechanism is a vertically-arranged drive shaft, the drive shaft is rotatably connected to an interior of a back portion of the barrel body, and a lower end of the drive shaft is provided with a first sector gear;

the feed dispensing mechanism has a shaft-shaped center, and a rear end of the feed dispensing mechanism is provided with a second sector gear; and the first sector gear is meshed with the second sector gear, and an upper end of the drive shaft is in power connection with the manual driving mechanism.

As a preferred embodiment of the present disclosure, the upper cover includes:

a cover plate body;

a vertically-arranged rotating shaft, rotatably connected to a middle portion of the cover plate body, where the rotating shaft is configured to pass through the cover plate body, and a lower end of the rotating shaft is provided with a first driving member;

a transversely-arranged handle, where one end of the handle is mounted at an upper end of the rotating shaft to drive the rotating shaft to rotate; and a top portion of the drive mechanism is provided with a second driving member, and the first driving member is in power connection with the second driving member via the drive mechanism.

As a preferred embodiment of the present disclosure, the other end of the handle is provided with a flip limiting member capable of flipping up and down, the flip limiting member has a first flip position and a second flip position, and a rotary limiting groove is disposed on one side of a top surface of the cover plate body;

when the flip limiting member is flipped to the first flip position, a portion of the flip limiting member is located within the rotary limiting groove to restrict rotation of the handle; and when the flip limiting member is flipped to the second flip position, the flip limiting member is detached from the rotary limiting groove, and the flip limiting member is perpendicular to the handle.

As a preferred embodiment of the present disclosure, one end of the flip limiting member away from the handle is a spherical structure, and the rotary limiting groove is an arc-shaped groove matched with the spherical structure.

As a preferred embodiment of the present disclosure, both the first driving member and the second driving member are gears, and the drive mechanism is a mutually-meshed gear transmission set that is disposed at a bottom portion of the cover plate body.

As a preferred embodiment of the present disclosure, an upper cover sealing plate is mounted on a bottom portion of the cover plate body, the upper cover sealing plate has a downward-recessed boss structure, a sealing ring is disposed around the boss structure, and the upper cover is sealingly mounted on the opening at the top portion of the barrel body via the sealing ring.

As a preferred embodiment of the present disclosure, a side face of the barrel body is provided with an observation window for observing a remaining amount of the pet food stored inside the barrel body.

Compared with the prior art, the present disclosure has the following beneficial effects.

1. This feeder is provided with a handle on the upper cover at the top portion of the barrel body. The feed dispensing mechanism at the lower portion is driven to rotate by the handle, thereby raising the position of action for operating the feed dispensing mechanism to the upper cover, which is easy and simple to handle. Meanwhile, the barrel body can be designed with a corresponding large capacity. As the whole body of the pet feeder contains no circuit equipment, the pet feeder can be freely washed after disassembly, thereby keeping the feeder clean.

2. The manually-powered drive mechanism for dispensing pet food in this feeder relies entirely on gear transmission, which is precise and efficient, and can precisely control the feed dispensing amount.

3. The handle of the upper cover of this feeder is provided with a flip limiting member capable of flipping up and down, and is cooperated with a magnetic rotary limiting groove on one side of the top surface of the cover plate body, to achieve the function of restricting rotation of the handle. After use, the flip limiting member is flipped downward to the first flip position such that a part thereof is located within the rotary limiting groove, and a magnet in the rotary limiting groove attracts the flip limiting member, thereby restricting the rotation of the handle. Such a configuration can effectively prevent pets from operating the handle by themselves, thus avoiding accidental dispensing and preventing pet food waste or overeating. When feed dispensing is needed, the flip limiting member is flipped upward to the second flip position to be detached from the rotary limiting groove and perpendicular to the handle. At this time, users can easily grip the flip limiting member to driven the handle to rotate along the rotating shaft, thereby driving the feed dispensing mechanism to operate and achieving the feed dispensing operation. This design enables the feed dispensing operation more precise and smoother, improving the user experience.

BRIEF DESCRIPTION OF THE DRAWINGS

To illustrate the technical solutions in the embodiments of the present disclosure more clearly, the following will briefly introduce the accompanying drawings required for describing the embodiments or in prior art. Obviously, the accompanying drawings described below are merely some embodiments of the present disclosure, and those skilled in the art may still arrive at other drawings from these drawings without any inventive efforts.

In the drawings.

Figure 1:
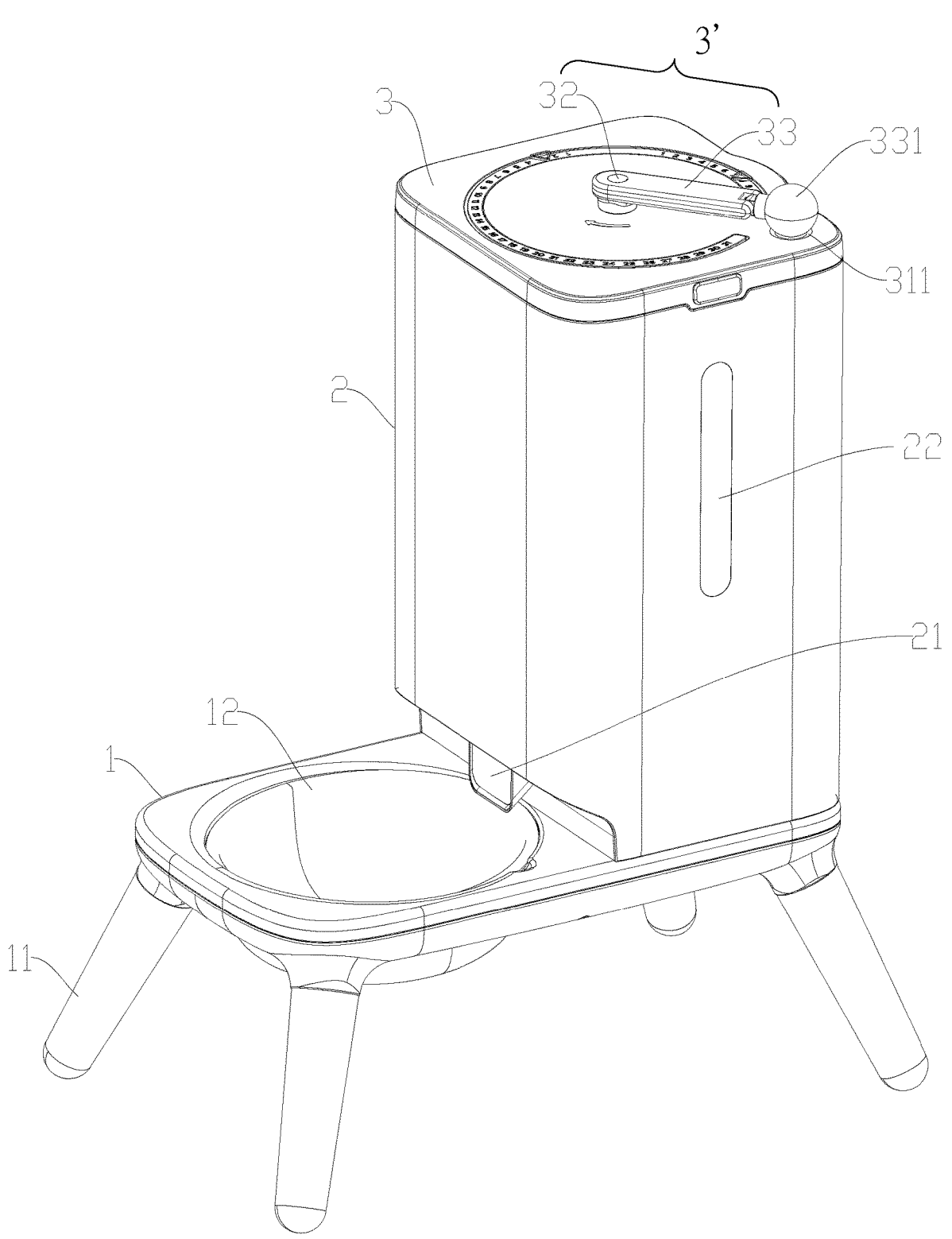
FIG. 1 is a structure diagram of a manual pet feeder with a flip limiting member being in a first flip position according to an embodiment of the present disclosure.

1, food bowl; 11, supporting foot; 12, tray; 13, barrel body seat; 2, barrel body; 21, feed outlet; 22, observation window; 23, converging port; 24, feed dispensing pipe; 25, feed dispensing mechanism; 251, second sector gear; 26, structural reinforcement portion; 27, drive shaft; 271, first sector gear; 272, second driving member; 3, upper cover; 31, cover plate body; 311, rotary limiting groove; 32, rotating shaft; 321, first driving member; 33, handle; 331, flip limiting member; 34, upper cover sealing plate; 341, boss structure; 342, sealing ring; 35, spring latch; 4, drive mechanism

DETAILED DESCRIPTION OF THE INVENTION

To make the technical problems to be solved, the technical solutions, and the beneficial effects of the present disclosure clearer, the present disclosure will be further described in detail below in conjunction with the accompanying drawings and embodiments. It should be noted that similar reference numerals and letters denote similar items in the following accompanying drawings. Therefore, once an item is defined in an accompanying drawing, it is not required to be further defined and explained in the subsequent accompanying drawings. It is hereby declared that the embodiments described below are merely used to interpret the present disclosure but are not construed as limiting the present disclosure.

It needs to be noted that the terms "mounted," "disposed" "connected" "fixed," and the like should be understood in a broad sense. For example, it may be fixed connection, detachable connection, or integral connection; it may be mechanical connection or electric connection; it may be direct connection or indirect connection through an intermediate medium, or it may be communication or interaction between the interiors of two elements, unless otherwise explicitly defined. The indicated directions or positional relationships are based on the directions or positional relationships shown in the accompanying drawings, or customary directions or positional relationships when the product in the present application is in use, or directions or positional relationships customarily understood by those skilled in the art, which is merely for the convenience of describing the present application and simplifying the description rather than indicating or implying that the indicated apparatus or element must have a particular direction or be constructed and operated in a particular direction, and thus may not be construed as limiting the present application. The terms "first" and "second" are merely for the convenience of description, and may not be construed as indicating or implying relative importance or implying the number of technical features.

As shown in FIGS. 1 to 4, the present embodiment provides a manual pet feeder. The lowest part of the manual pet feeder is the food bowl 1, with four supporting feet 11 below the food bowl 1. The concave tray 12 is detachably mounted in the front portion of the food bowl 1 to facilitate the removal of the tray 12 from the food bowl 1 for cleaning. A barrel body seat 13 as the mounting base for the barrel body 2 is detachably mounted in the rear portion of the food bowl 1. The barrel body 2 is detachably connected to the barrel body seat 13, making it convenient to remove the barrel body 2 from the barrel body seat 13 for cleaning. The top portion of the barrel body 2 is open, and the bottom portion thereof is provided with a feed outlet 21. The feed outlet 21 is located above the edge of the tray 12. When pet food is dispensed from the barrel body 2, the pet food is output through the feed outlet 21 into the tray 12 for the pet to eat.

In some feasible embodiments, the food bowl 1 may have a certain angle of inclination, for example, inclined forward by 5°-15°, especially 8°, 9°, or 10°, to facilitate smooth dispensing and make it easier for the pet to eat the pet food. The food bowl 1 has a certain angle of inclination, which has another advantage of reducing the accumulation of pet food in front of the bin door, allowing the pet food to be more distributed around the bowl evenly.

As shown in FIG. 1, the observation window 22 is disposed inside the side face of the barrel body 2 for observing the remaining amount of pet food stored inside the barrel body 2.

Figure 3:
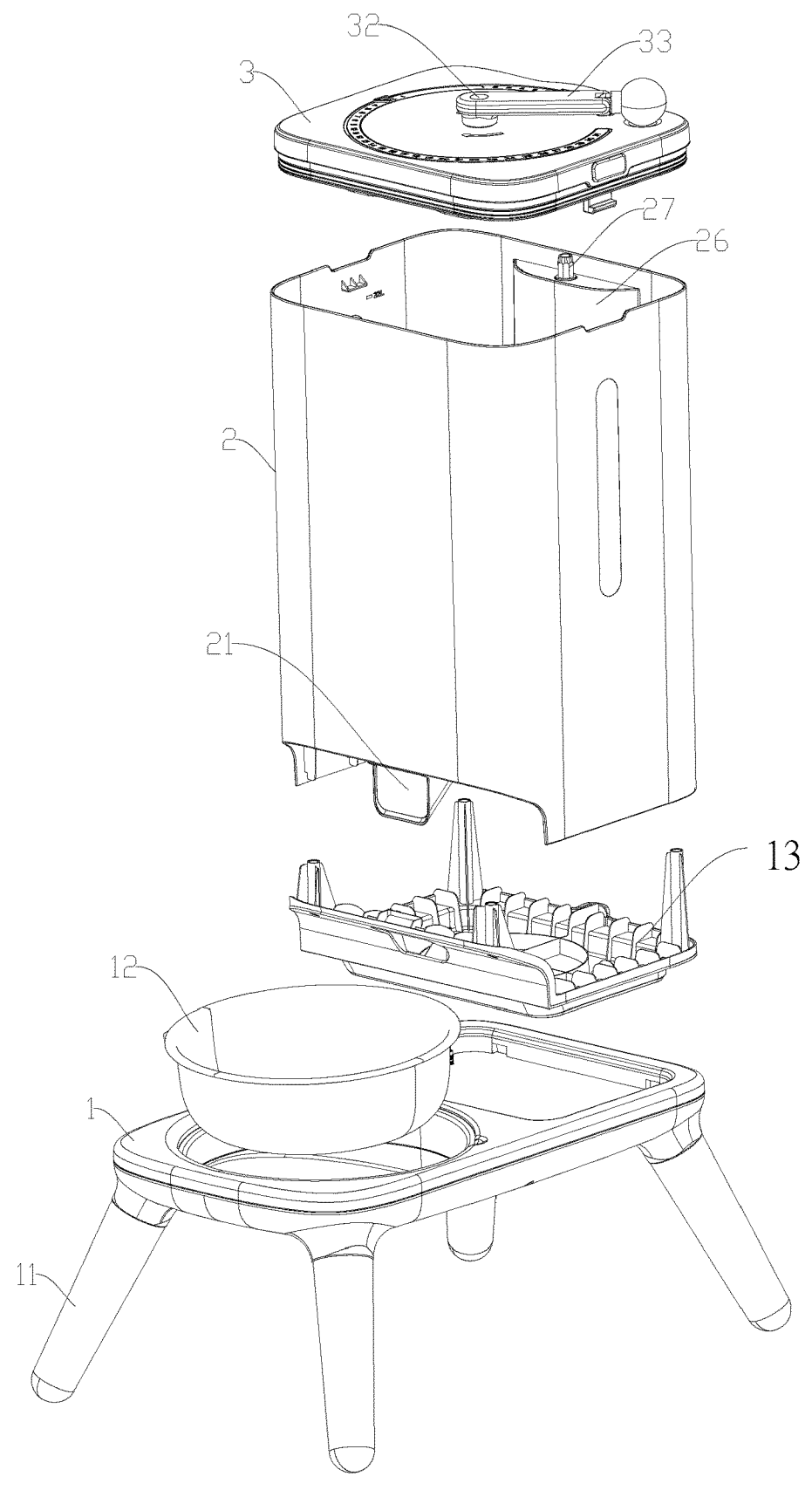
FIG. 3 is an exploded view of the manual pet feeder according to an embodiment of the present disclosure.

As shown in FIG. 3, the top portion of the barrel body 2 is open, and an upper cover 3 is detachably mounted at the top portion of the barrel body 2 such that users may easily open the upper cover 3 to clean the inside of the barrel body 2 thoroughly, making it convenient for the user to store pet food in the barrel body 2.

Figure 2:
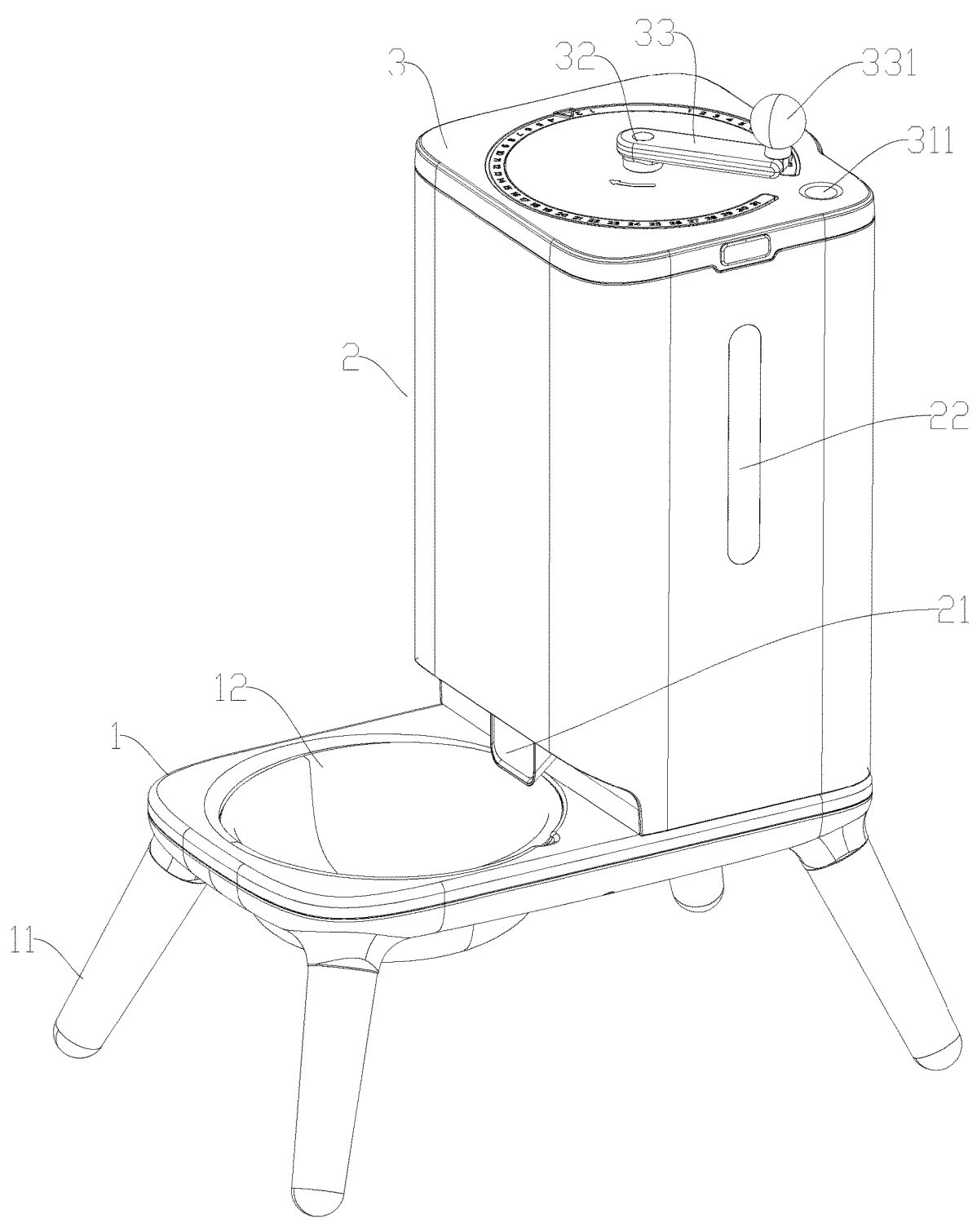
FIG. 2 is a structure diagram of a manual pet feeder with the flip limiting member being in a second flip position according to an embodiment of the present disclosure.
Figure 5:
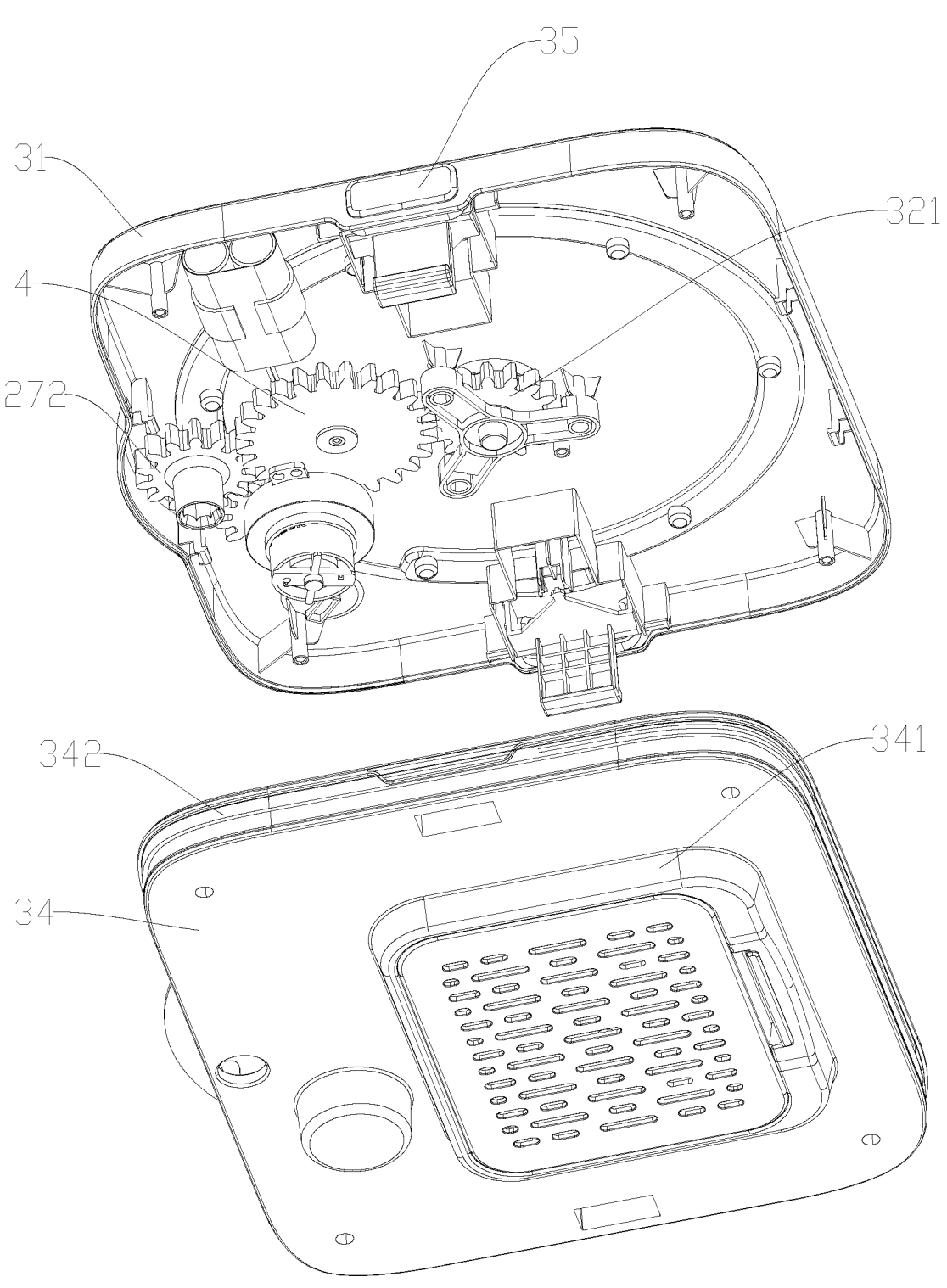
FIG. 5 is an exploded view of an upper cover of the manual pet feeder according to an embodiment of the present disclosure.

As shown in FIGS. 1, 2, and 5, specifically, the upper cover 3 includes a cover plate body 31 and a rotatable manual driving mechanism 3' at a top portion thereof, wherein the rotatable manual driving mechanism 3' includes a vertically-arranged rotating shaft 32, and a transversely-arranged handle 33. The rotating shaft 32 is rotatably connected to the middle portion of the cover plate body 31 and is configured to pass through the cover plate body 31. One end of the handle 33 is mounted to the upper end of the rotating shaft 32 to drive the rotating shaft 32 to rotate. The other end of the handle 33 is provided with a flip limiting member 331 capable of flipping up and down. The flip limiting member 331 has a first flip position and a second flip position. One side of the top surface of the cover plate body 31 is provided with a rotary limiting groove 311, and a magnet for attracting the flip limiting member 331 is embedded inside the rotary limiting groove 311. When the flip limiting member 331 is flipped downward to the first flip position, a portion of the flip limiting member 331 is located within the rotary limiting groove 311, and the magnet inside the rotary limiting groove 311 attracts the flip limiting member 331, thereby restricting the rotation of the handle 33 at this time. When the flip limiting member 331 is flipped upward to the second flip position, the flip limiting member 331 is detached from the rotary limiting groove 311 and is perpendicular to the handle 33. At this time, the flip limiting member 331 is in a vertical state, making it convenient for the user to grip the flip limiting member 331 and drive the handle 33 to rotate along the drive shaft 27.

In some feasible embodiments, the flip limiting member 331 is hinged to the handle 33 by a damping rotating shaft. During flipping, a preset force needs to be applied to switch positions, further preventing accidental flipping by pets.

In some feasible embodiments, one end of the flip limiting member 331 away from the handle 33 is a spherical structure, and the rotary limiting groove 311 is an arc-shaped groove matched with the spherical structure. When the flip limiting member 331 is flipped to the first flip position and enters the rotary limiting groove 311, the spherical structure may be well embedded into the arc-shaped groove to form a stable fit between the flip limiting member 331 and the groove, thereby more reliably restricting the rotation of the handle 33 and preventing accidental rotation of the handle 33 due to shaking or pet contact, etc., resulting in unintended dispensing. When flipped to the second flip position and detached from the groove, it is convenient for the user to grip the flip limiting member 331 and drive the handle 33 to rotate. The fit between the spherical structure and the arc-shaped groove, as compared to some sharp or irregular fit structures, results in less wear on the flip limiting member 331 and the rotary limiting groove 311 during repeated operations. The surfaces of the spherical structure and the arc-shaped groove are relatively smooth, resulting in a more uniform stress distribution during mutual contact and friction, which is not easy to generate localized excessive wear. Such a configuration extends the service life of the flip limiting member 331 and the rotary limiting groove 311, and reduces the maintenance cost of the feeder.

As shown in FIG. 5, to slow down or prevent the pet food inside the barrel body 2 from being affected with damp and deteriorating, an upper cover sealing plate 34 is mounted at the bottom portion of the cover plate body 31. The upper cover sealing plate 34 has a downward-recessed boss structure 341, and a sealing ring 342 is disposed around the boss structure 341. The upper cover 3 is sealingly mounted on the opening at the top portion of the barrel body 2 via the sealing ring 342.

Figure 4:
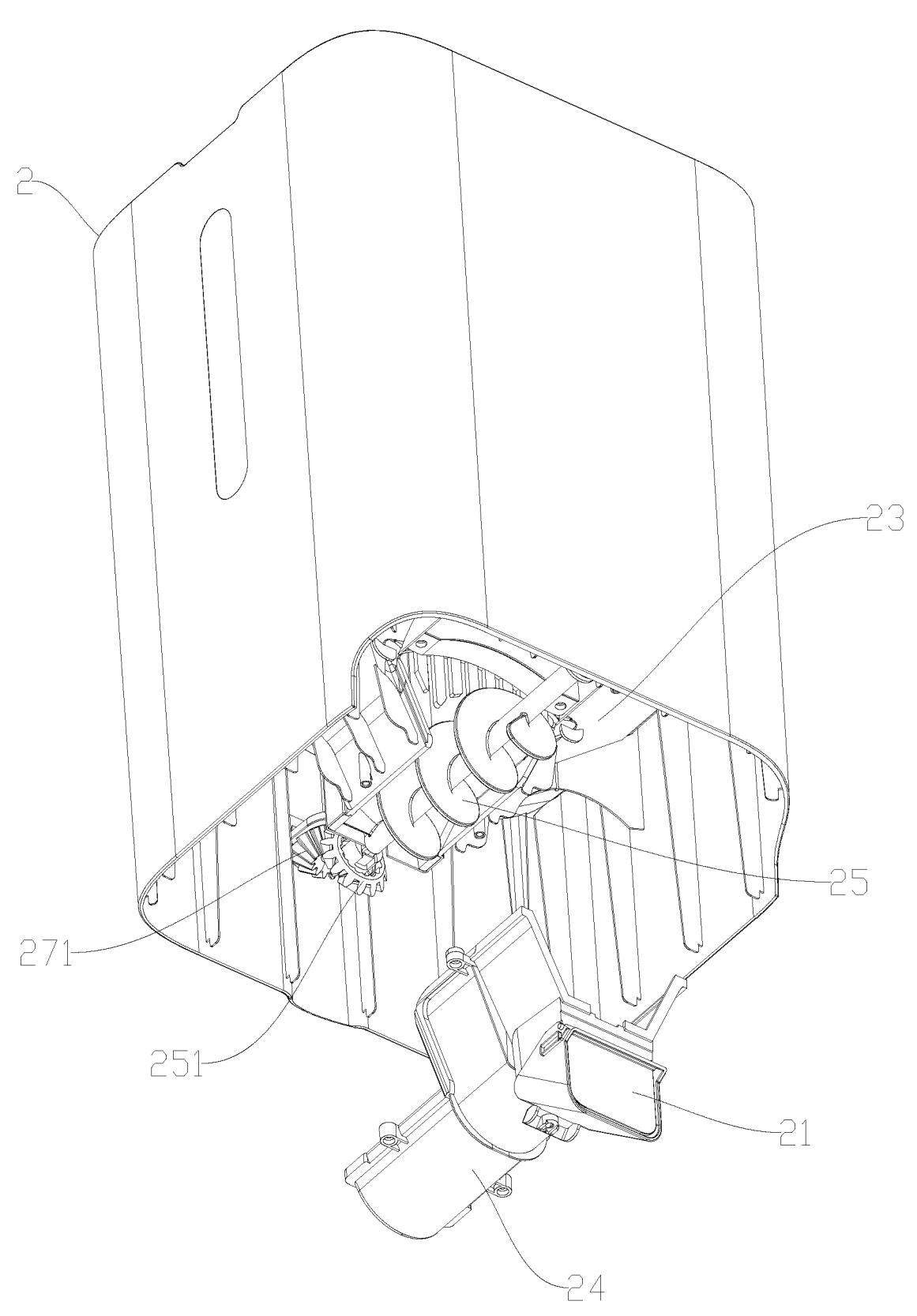
FIG. 4 is an exploded view of a barrel body of the manual pet feeder according to an embodiment of the present disclosure.

As shown in FIG. 4, at the portion of the barrel body 2, a funnel-shaped converging port 23 and a transversely-arranged feed dispensing pipe 24 are disposed at the lower end inside the barrel body 2. The feed dispensing pipe 24 is internally provided with the feed dispensing mechanism 25, one end of the feed dispensing pipe 24 is abutted to the converging port 23, and the other end of the feed dispensing pipe 24 is abutted to the feed outlet 21, thereby forming a continuous feed dispensing channel. This makes the overall structure of the feed dispensing system more compact, reduces the unnecessary space occupation, and renders the overall design of the feeder more reasonable. Meanwhile, the compact structure also helps to improve the stability and reliability of feed dispensing, and reduces feed dispensing failures or pet food leakage caused by loose structures.

In some feasible embodiments, the feed dispensing mechanism 25 adopts an auger mechanism, which has the advantages such as strong conveying capacity and uniform delivery. By adopting an auger mechanism as the feed dispensing mechanism 25 in the pet feeder, the conveying capacity of pet food may be accurately controlled, which ensures that the quantity dispensed each time is relatively stable, thereby meeting the feeding needs of pets at different growth stages. Meanwhile, the auger mechanism features a relatively simple structure and reliable operation, and is capable of adapting to the delivery of pet food of various types and particle sizes, thereby improving the versatility of the feeder.

As shown in FIG. 5, the feed dispensing pipe 24 is a split structure, and a portion of the outer wall is integrally designed with the lower portion of the barrel body 2. This structural design makes disassembly and assembly of the auger mechanism more convenient.

As shown in FIGS. 3 to 5, a structural reinforcement portion 26 is disposed at the back of the barrel body 2. The structural reinforcement portion 26 may significantly improve the structural strength and rigidity of the back of the barrel body 2. A drive mechanism is disposed inside the structural reinforcement portion 26, making full use of the space of the barrel body 2 and rendering the structure more compact. Specifically, the drive mechanism is a vertically-arranged drive shaft 27 which is rotatably connected to the interior of the back of the barrel body 2. The lower end of the drive shaft 27 is provided with a first sector gear 271. The feed dispensing mechanism 25 has a shaft-shaped center, and the rear end of the feed dispensing mechanism 25 is provided with a second sector gear 251. The first sector gear 271 is meshed with the second sector gear 251. The lower end of the rotating shaft 32 is provided with a first driving member 321, and the top portion of the drive shaft 27 is provided with a second driving member 272. The first driving member 321 is in power connection with the second driving member 272 via the drive mechanism 4.

When the rotating shaft 32 is driven by the handle 33 to rotate, the drive shaft 27 is driven to rotate by the rotating shaft 32 through the transmission of the first driving member 321, the drive mechanism 4, and the second driving member 272. Thereby, the first sector gear 271 is meshed with the second sector gear 251 to drive the feed dispensing mechanism 25 disposed inside the feed dispensing pipe 24 to rotate. At this time, the pet food in the barrel body 2 is driven by the feed dispensing mechanism 25 to converge toward the front of the feed dispensing channel. After accumulating to a certain amount, the pet food falls from the feed outlet 21 of the feed dispensing channel onto the tray 12.

As shown in FIG. 5, both the first driving member 321 and the second driving member 272 are gears, and the drive mechanism 4 is a mutually-meshed gear transmission set that is disposed at the bottom portion of the cover plate body 31. Gear transmission is featured by smooth transmission and accurate transmission ratio. The first driving member 321 and the second driving member 272 adopt a gear form, as well as the drive mechanism 4 is a gear transmission set, which may ensure that power is transmitted smoothly and free of impact, thus reducing vibration and noise during transmission, and improving the use comfort of the pet feeder.

Preferably, a ratchet gear member for controlling the unidirectional rotation of the gear may be disposed at any gear in the drive mechanism 4, so as to prevent the drive mechanism 4 from rotating in the reverse direction and avoid damage to the transmission system caused by reverse rotation.

As shown in FIG. 5, the upper cover sealing plate 34 is detachably mounted to the bottom portion of the cover plate body 31. After the upper cover sealing plate 34 and the cover plate body 31 are assembled, an internal cavity structure is formed. The detachable upper cover sealing plate 34 makes installation and removal of the drive mechanism 4 more convenient. When assembling the feeder, the drive mechanism 4 may be first mounted in the cavity formed at the bottom portion of the cover plate body 31, and then the upper cover sealing plate 34 is mounted. In case of maintaining or repairing the drive mechanism 4, it is only necessary to dismantle the upper cover sealing plate 34 to directly operate the drive mechanism 4, thereby improving the installation and maintenance efficiency. The cavity structure provides a relatively enclosed protection space for the drive mechanism 4 and the spring latch 35, which may prevent external factors such as dust and moisture from entering, reduce wear and corrosion of the drive mechanism 4 and the spring latch 35, and ensure their normal operation. Meanwhile, the cavity structure may also exert certain buffer action, which may protect the drive mechanism 4 and the spring latch 35 from damage when the feeder undergoes external impact.

It should be noted that the detachable mounting and detachable connection modes mentioned above include easily detachable connection modes such as snap-fit connection and threaded connection, so as to meet the easy-disassembly and easy-to-clean requirements of pet supplies.

It should be understood that improvements or variations may be made by those skilled in the art based on the above description, and all these improvements and variations shall fall within the scope of protection defined by the appended claims of the present disclosure.

The present disclosure has been exemplarily described above in conjunction with the accompanying drawings. Obviously, the implementation of the present disclosure is not limited to the above-mentioned methods. Any improvements made by adopting the inventive concept and technical solutions of the present disclosure, or direct application of the inventive concept and technical solutions of the present disclosure to other scenarios without any improvement, shall all fall within the scope of protection of the present disclosure.

What is claimed is:

1. A manual pet feeder, comprising:
   a barrel body, having an opening at a top portion thereof and a feed outlet at a bottom portion thereof, and a feed dispensing mechanism being disposed at the bottom portion of the barrel body corresponding to the feed outlet; and
   an upper cover, detachably and sealingly mounted on the opening at the top portion of the barrel body, and a top portion of the upper cover having a rotatable manual driving mechanism;
   a drive mechanism being disposed inside a side face of the barrel body, and the manual driving mechanism being connected to the feed dispensing mechanism via the drive mechanism to drive the feed dispensing mechanism to operate, so that pet food stored in the barrel body is output through the feed outlet;
   a funnel-shaped converging port and a transversely-arranged feed dispensing pipe are disposed at a lower end inside the barrel body, the feed dispensing pipe is internally provided with the feed dispensing mechanism, one end of the dispensing pipe is abutted to the converging port, and the other end of the feed dispensing pipe is abutted to the feed outlet.

2. The manual pet feeder according to claim 1, wherein the manual pet feeder further comprises a food bowl, a barrel body seat is disposed at a rear portion of the food bowl, the barrel body is detachably connected to the barrel body seat, a concave tray is detachably mounted at a front portion of the food bowl, and the feed outlet is located above an edge of the tray.

3. The manual pet feeder according to claim 1, wherein the drive mechanism is a vertically-arranged drive shaft, the drive shaft is rotatably connected to an interior of a back portion of the barrel body, and a lower end of the drive shaft is provided with a first sector gear;
   the feed dispensing mechanism has a shaft-shaped center, and a rear end of the feed dispensing mechanism is provided with a second sector gear; and
   the first sector gear is meshed with the second sector gear, and an upper end of the drive shaft is in power connection with the manual driving mechanism.

4. The manual pet feeder according to claim 1, wherein the upper cover comprises:
   a cover plate body;
   the rotatable manual driving mechanism comprises a vertically-arranged rotating shaft, rotatably connected to a middle portion of the cover plate body, where the rotating shaft is configured to pass through the cover plate body, and a lower end of the rotating shaft is provided with a first driving member;
   the rotatable manual driving mechanism comprises a transversely-arranged handle, wherein one end of the handle is mounted at an upper end of the rotating shaft to drive the rotating shaft to rotate; and a top portion of the drive mechanism is provided with a second driving member, and the first driving member is in power connection with the second driving member via the drive mechanism.

5. The manual pet feeder according to claim 4, wherein the other end of the handle is provided with a flip limiting member capable of flipping up and down, the flip limiting member has a first flip position and a second flip position, and a rotary limiting groove is disposed on one side of a top surface of the cover plate body;

when the flip limiting member is flipped to the first flip position, a portion of the flip limiting member is located within the rotary limiting groove to restrict rotation of the handle; and when the flip limiting member is flipped to the second flip position, the flip limiting member is detached from the rotary limiting groove, and the flip limiting member is perpendicular to the handle.

6. The manual pet feeder according to claim 5, wherein one end of the flip limiting member away from the handle is a spherical structure, and the rotary limiting groove is an arc-shaped groove matched with the spherical structure.

7. The manual pet feeder according to claim 4, wherein both the first driving member and the second driving member are gears, and the drive mechanism is a mutually-meshed gear transmission set that is disposed at a bottom portion of the cover plate body.

8. The manual pet feeder according to claim 4, wherein an upper cover sealing plate is mounted on the bottom portion of the cover plate body, the upper cover sealing plate has a downward-recessed boss structure, a sealing ring is disposed around the boss structure, and the upper cover is sealingly mounted on the opening at the top portion of the barrel body via the sealing ring.

9. The manual pet feeder according to claim 1, wherein a side face of the barrel body is provided with an observation window for observing a remaining amount of the pet food stored inside the barrel body.

\* \* \* \* \*